United States Patent
Warnecke

(10) Patent No.: US 6,805,234 B2
(45) Date of Patent: Oct. 19, 2004

(54) ROLLER CONVEYOR

(75) Inventor: Karl Warnecke, Sibbesse (DE)

(73) Assignee: Transnorm System GmbH, Harsum (DE)

( * ) Notice: Subject to any disclaimer, the term of this patent is extended or adjusted under 35 U.S.C. 154(b) by 0 days.

(21) Appl. No.: 10/436,314

(22) Filed: May 12, 2003

(65) Prior Publication Data

US 2003/0213679 A1 Nov. 20, 2003

(30) Foreign Application Priority Data

May 14, 2002 (DE) .......................................... 202 07 498

(51) Int. Cl.$^7$ ........................... B65G 13/06; B65G 13/07
(52) U.S. Cl. .................................. 198/790; 198/781.09
(58) Field of Search ................................ 198/789, 790, 198/781.04, 781.09

(56) References Cited

U.S. PATENT DOCUMENTS

| | | | |
|---|---|---|---|
| 3,752,297 A | | 8/1973 | Lemaresquier |
| 4,473,148 A | * | 9/1984 | Saur ....................... 198/781.09 |
| 4,753,339 A | * | 6/1988 | Vogt et al. .............. 198/781.03 |
| 5,176,246 A | * | 1/1993 | Wiggers et al. ............. 198/790 |
| 5,582,287 A | * | 12/1996 | Heit et al. .............. 198/781.09 |
| 5,984,082 A | * | 11/1999 | Geib ........................... 198/790 |

FOREIGN PATENT DOCUMENTS

| | | |
|---|---|---|
| CH | 512381 | 9/1971 |
| DE | 1951476 | 7/1971 |
| DE | 2213291 | 9/1973 |
| DE | 9218640.8 | 5/1995 |
| FR | 2108878 | 5/1992 |
| WO | WO2000-40485 | 9/2000 |

* cited by examiner

Primary Examiner—Gene O. Crawford
(74) Attorney, Agent, or Firm—Collard & Roe, P.C.

(57) ABSTRACT

A roller conveyor with rotating rollers for transporting goods with a belt for driving the rollers arranged under the rollers, whereby the belt is aligned substantially vertical, is characterized in that on the upper edge of the belt, in contact with the rollers, a continuous profile element is arranged, and that the profile element is designed wider than the belt and projects over the latter on both sides.

15 Claims, 6 Drawing Sheets

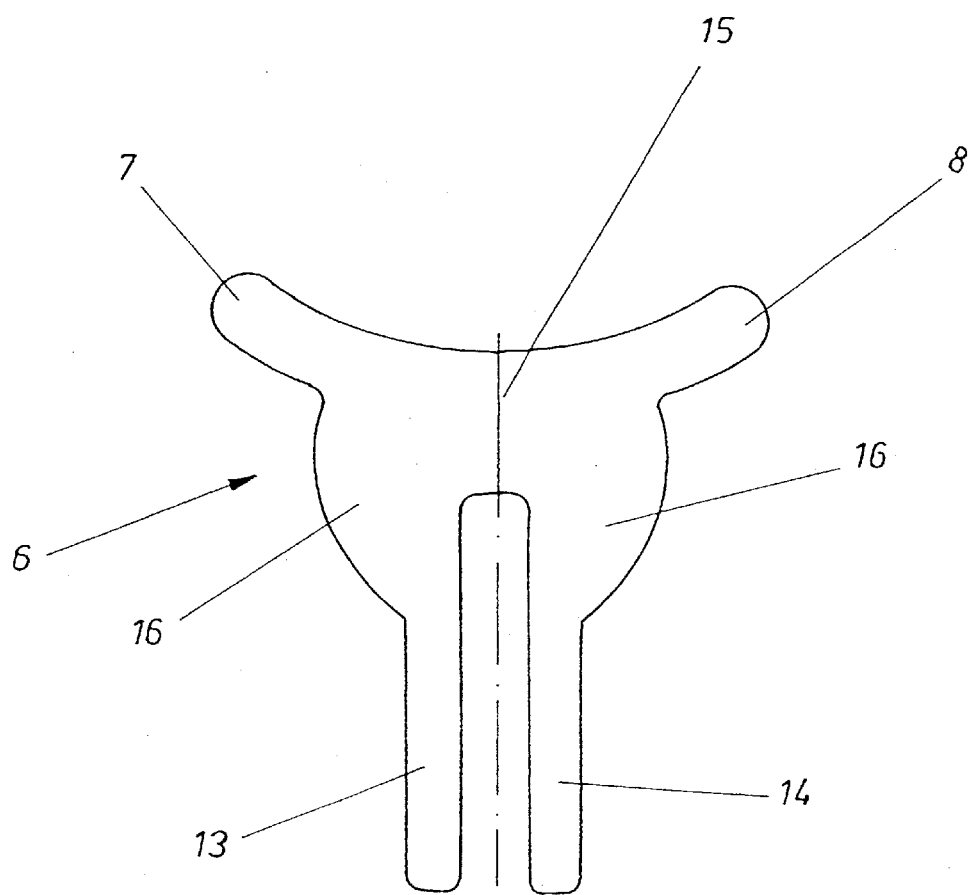

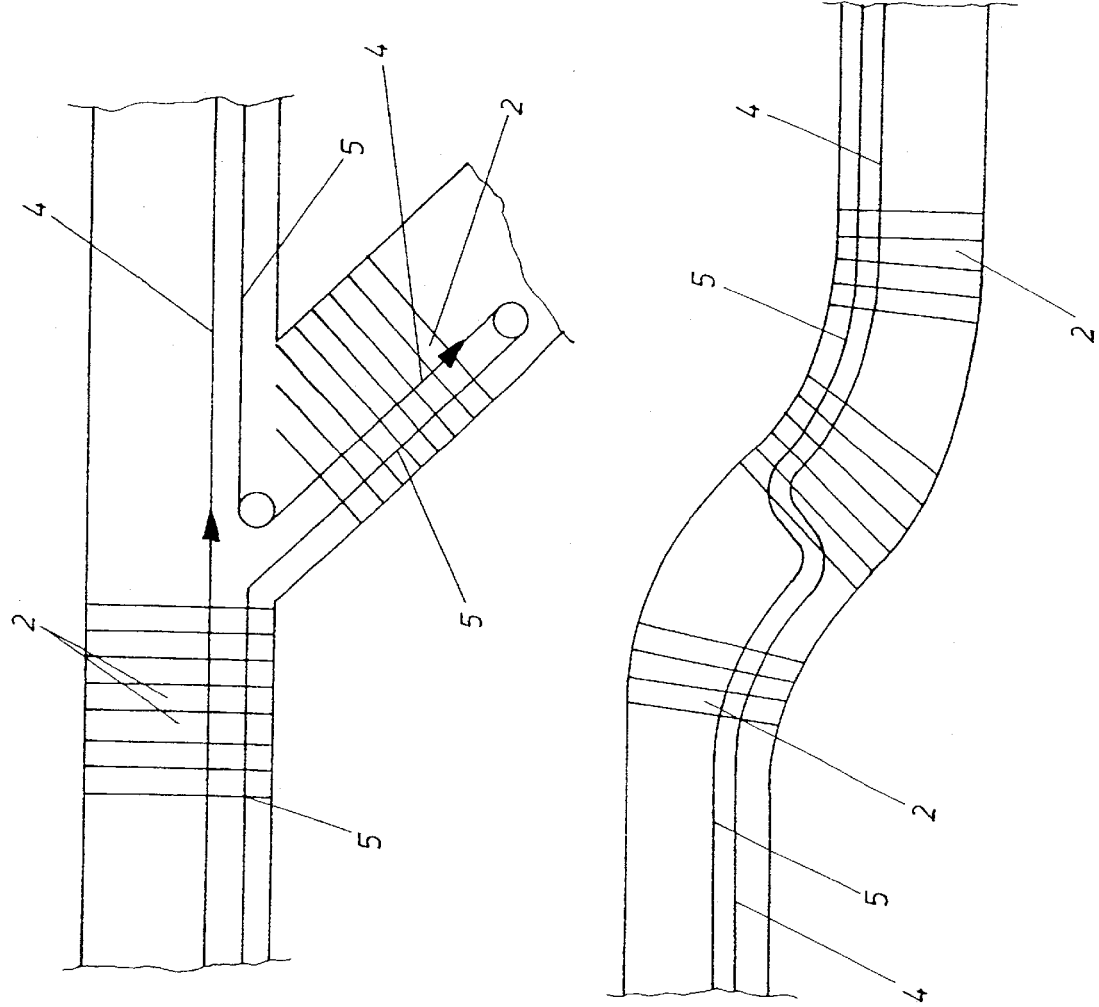

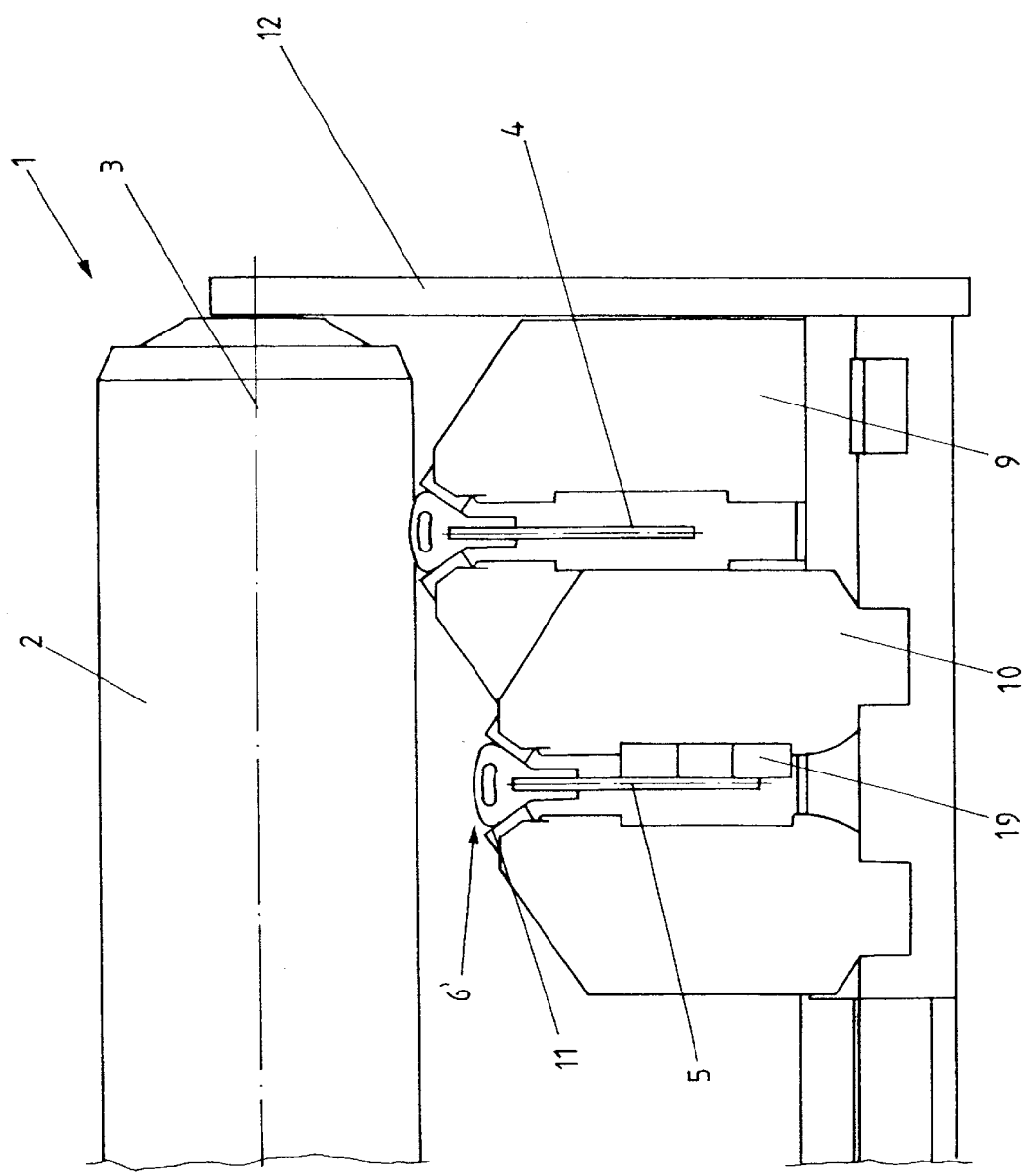

ROLLER CONVEYOR

This invention relates to a roller conveyor with pivoting rollers for transporting goods and with a belt arranged under the rollers for driving the rollers, whereby the belt is aligned substantially vertical.

BACKGROUND OF THE INVENTION

Such roller conveyors with driven roller tracks are already known. Basically these drives are constituted either by chains or belts. The advantage of belts over chains is that a belt drive is comparatively low in noise and can reach high speeds. With a belt drive there is a distinction made between a drive using flat belts and round belts. Examples of flat belts also are toothed belts. By comparison, V-belts come under the category of round belts. The advantage to the flat belt is that large forces can be transferred. But due to its horizontal alignment beneath the rollers the flat belt cannot be bent to the sides and accordingly is suited only for drive in straight sections. Cross ties, such as for example Kevlar threads or wire pulls or also quite generally particularly hard-wearing fabric, are integrated into flat belts, so that roller conveyors with lengths of approximately 20 m to 30 m can be driven with the flat belt with its substantially rectangular profile. On the contrary, round belts can also be guided to the sides and can thus also be used for driving in curves, for example. Such round belts are generally suitable only for roller conveyors up to 10 m.

OBJECT OF THE INVENTION

The object of the invention is to provide a roller conveyor of the type initially outlined, which can also be driven in curved areas with a belt particularly capable of bearing.

BRIEF SUMMARY OF THE INVENTION

According to the present invention in the case of a roller conveyor with pivoting rollers for transporting goods and with a belt arranged over the rollers for driving the rollers, whereby the belt is aligned substantially vertical, arranged on the upper edge of the belt, with in contact the rollers, is a continuous profile element without interruptions and the profile element is designed to be wider than the belt and projects over the latter from both sides. It can be a lengthways extending belt, in particular with a substantially rectangular profile, which is adequately provided with cross ties, such as Kevlar threads or wires, and in this way can withstand particularly high tensile forces and can be designed correspondingly long. Through vertical alignment of the belt lateral movement is also feasible, and the belt can follow the curves and arcs of the roller conveyor. With such alignment it is a further advantage if less contamination can accumulate on the relatively narrow upper edge of the profile element and thus also less dirt is transferred to the rollers and the goods to be conveyed. Maintenance expenses are also accordingly lower. This particularly so, as the upper width of the profile element is less than the otherwise standard width of the belt or, in the present case, the width of the profile element is less than the height of the vertically positioned belt. The profile element is designed to be continuous over the entire length of the belt, so that there is constant contact being made by the profile element with the rollers driven by the belt and the profile element. The profile element is designed wider than the belt and projects over the latter on both sides, guaranteeing good power transfer. At the same time the profile element is preferably designed symmetrical, in particular symmetrical to the vertical axis of the belt.

The profile element preferably has polyurethane or consists of polyurethane or another material, which has a comparatively high friction coefficient and additionally can be moved laterally. The profile element is preferably designed substantially T-shaped and in one piece. This means that the central leg of the T is provided with a central slot, can be set on the belt and can be connected thereto, and the upper transverse beam of the T, with a broader face compared to the upper edge of the belt, can come to bear on the roller. Particularly preferably the profile element is designed as a 2-point bearing. When this is designed as a T-profile both outer ends are arched upwards, resulting overall in cleated bending or arching. Both outer areas then form the 2-point bearing.

In another particularly preferred embodiment the profile element is preferably one piece and is designed arched, resulting in a heaped or convex arch. Here the central part of the profile element, in contact with the rollers, is higher than the outer areas of the profile element which project laterally over the belt. The profile element is designed preferably as a segment of a circle and in a further preferred embodiment has a recess, which beneficially has a longitudinal form and is designed to be at a constant distance to the upper sealing surface of the profile element. The result of this recess is that the profile element can subside resiliently and the rollers can loop in the longitudinal direction of the belt, so that the profile element not only comes into contact with the roller in contact at one point, but over a certain length, viewed in the direction of traction.

In cross-section the belt is designed substantially rectangular. Such belts are particularly simple to manufacture. In another preferred further development of the invention the belt and the profile element are designed monobloc.

The belt is preferably arranged in the vicinity of the inner curve of the roller conveyor and lies in this region on the rollers. The roller conveyor preferably has crowned drive and guide elements, by which the vertically aligned belt is guided to prevent it from twisting. It is also beneficial, t provide ball bearings arranged laterally on the vertically aligned belt. This results in particularly good curving. The ball bearings are preferably arranged in curved regions in the external radius. In a further development the ball bearings are arranged at certain distances alternating on both sides of the belt.

A further aspect of the invention is the preparation of a belt for the roller conveyor according to the present invention with the above described preferred configurations.

BRIEF DESCRIPTION OF DRAWINGS

The invention will now be explained hereinbelow in greater detail with reference to a preferred embodiment illustrated in the diagrams. The diagrammatic representations individually show:

FIG. 3 in a sectional view of a profile element;

FIG. 4 in a schematic view of a first design of a roller conveyor according to the present invention;

FIG. 5 in a schematic view of a second design of a roller conveyor according to the present invention;

FIG. 6 in a sectional view of a second embodiment of a roller conveyor according to the present invention, and FIG. 7 in a sectional view of the belt with a profile element as per the embodiment in FIG. 6.

DETAILED DESCRIPTION OF THE INVENTION

Figure 1:
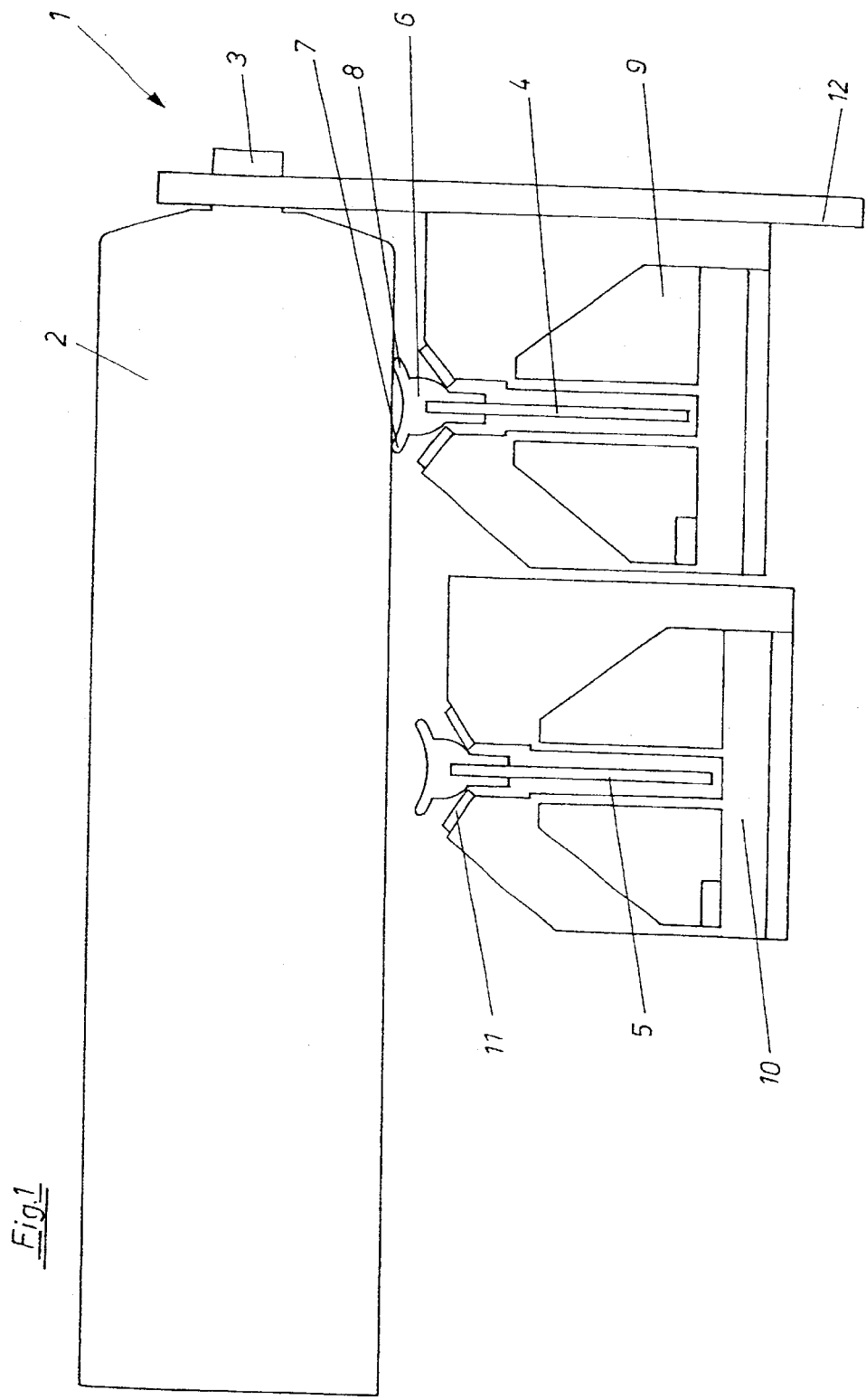
FIG. 1 in a sectional view of a roller conveyor according to the present invention.
Figure 2:
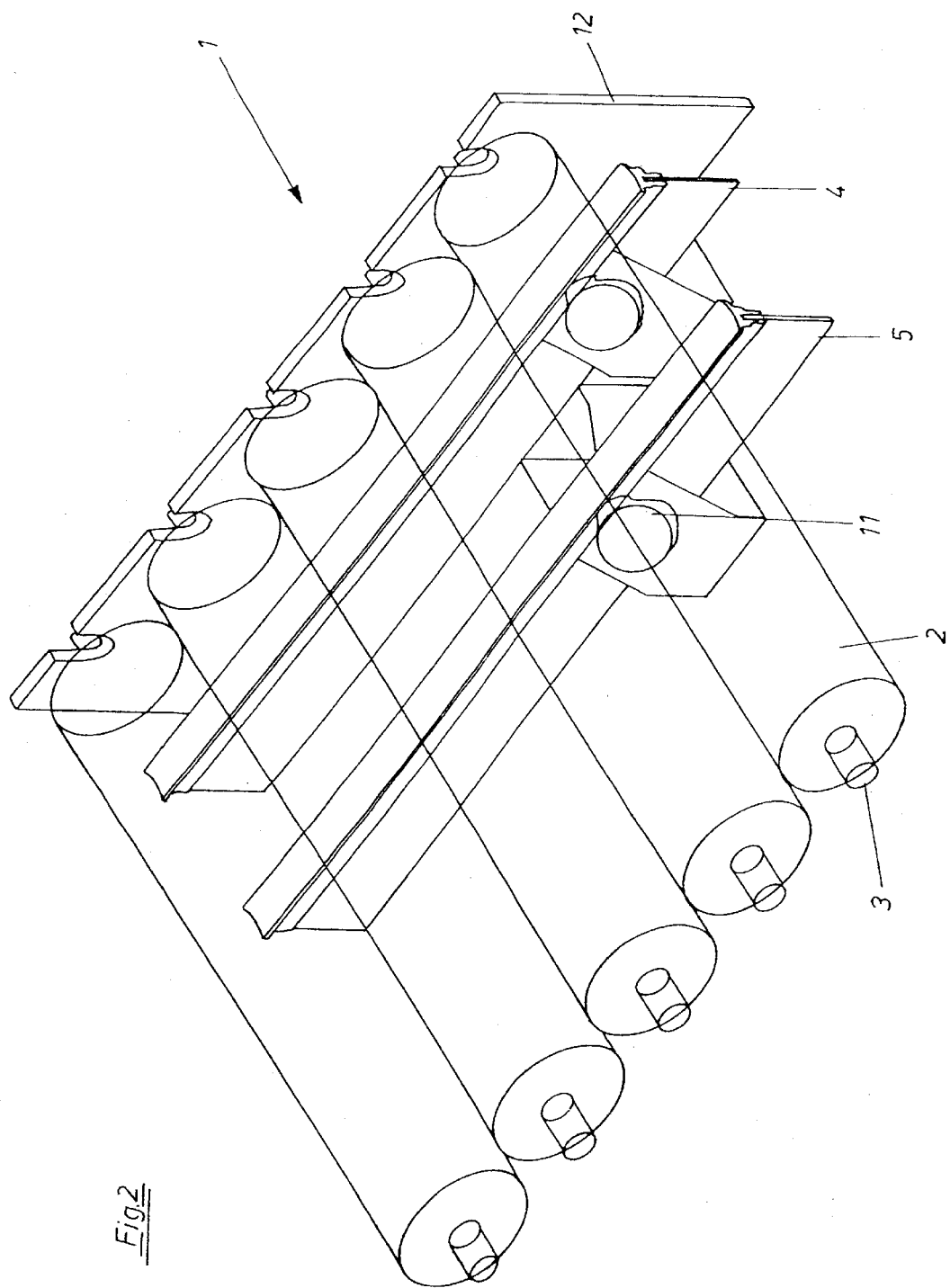
FIG. 2 in a perspective view of a section of a roller conveyor according to the present invention.

FIG. 1 illustrates a cross-section through a roller conveyor according to the present invention. A roller 2 with an axis 3 is mounted in a side cheek 12. A plurality of such rollers 2 arranged successively forms the essential part of the roller conveyor generally designated by 1 (FIG. 2). The roller conveyor is driven by a vertically disposed belt 4 with a substantially lengthways or rectangular cross-section. The same revolving belt is designated in its returning section by 5. This returning section of the belt 5 is guided more deeply than the out-running driving section of the belt 4, so that only the upper area of the belt 4 comes to rest on the rollers 2. For this the belt 4 is held in a mounting 9 or the returning belt 5 is held in a mounting 10 or guided and driven by drive elements 11. At its upper edge the belt 4 has a profile element 6, which has two pre-arched or upwards arched areas 7 and 8, forming a 2-point bearing on the roller 2.

FIG. 2 is a perspective view of the roller conveyor 1 according to FIG. 1. Identical parts are indicated with the same reference numerals. More clearly recognized here are the drive elements or guide elements 11 arranged in the mountings 9 and 10.

FIG. 3 illustrates a cross-sectional view of a profile element 6. This is designed substantially in a T-shape, whereby the central leg of the T is formed by both longitudinal sections 13 and 14, which enclose between them a notch and overall are designed such that between them the belt 4 or 5 can be inserted and fastened there or fastened in some other way. The upper reach 15 is designed broadened, resulting overall in a bearing surface broadened compared to the upper edge of the belt. At the same time both outer end areas 7 and 8 are arched high, thus forming a 2-point bearing. In the side regions circular, outwards arched, thickened areas 16 are formed, in which drive and guide elements can engage. Failure of the roller conveyor due to wear is counteracted by the areas 16 which are designed strengthened and outwardly spherical.

FIG. 4 illustrates a first embodiment of a roller conveyor according to the present invention. The driving belt 4 runs in the arrow direction. Use of the belt according to the present invention enables it to be used also in inwards or outwards transfer, without additional motors being necessary, as shown in FIG. 4.

FIG. 5 illustrates an S-curve, in which the driving belt 4 is constantly guided on the inside of the curve, whereby in the central section of the curve, where the preceding sign of the increase changes in mathematical terms, the belts are guided on the other side, so that the driving belt 4 then runs on the inside track along the curve of the roller conveyor.

FIG. 6 illustrates a cross-section through a second embodiment of a roller conveyor according to the present invention comparable to the illustration in FIG. 1. Identical parts are identified by the same reference numerals. Differing from the illustration according to FIG. 1 a profile element 6' is arranged on the upper edge of the revolving belt 4 or of the returning belt 5 in the upper end area or on the upper edge, which, in its geometric configuration, deviates from the embodiment in FIG. 1. The profile element 6' rests in the mounting 9 or in the case of the returning belt in the mounting 10 on drive and guide elements 11, which engage in particular in the profile element 6'. The drive elements 11 have roller and/or ball bearings. Ball bearings 19 are provided laterally positioned on the vertical belt 5, resulting in improved curving.

Figure 7:
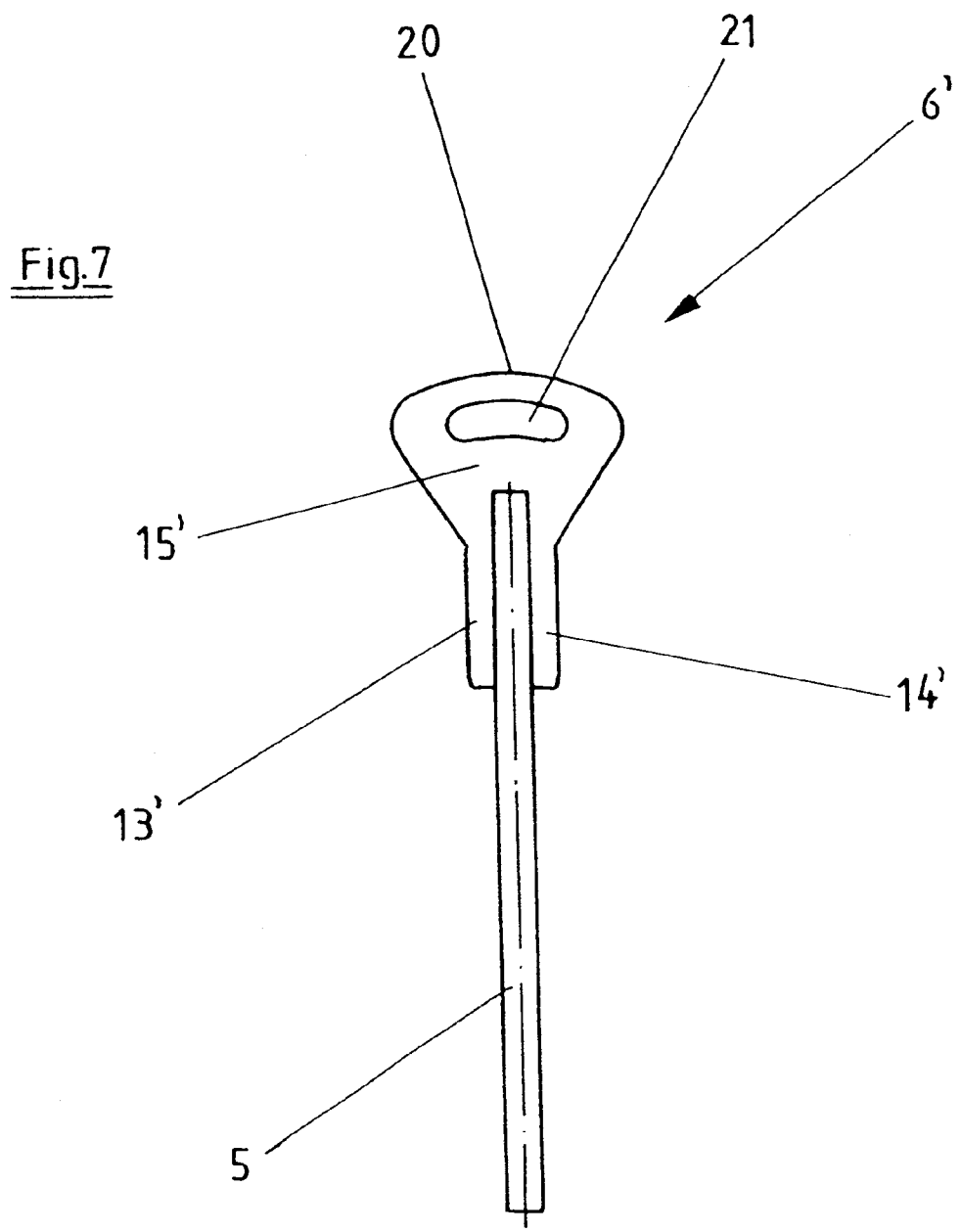

FIG. 7 illustrates a cross-sectional view of the belt with the profile element arranged thereon as per FIG. 6. Arranged on the vertical belt 5 is the profile element 6' which has an upper broadened area 15' connecting to both longitudinal sections 13' and 14', which between them form a notch and are designed such that between them the belt 4 or the belt 5 can be inserted and fastened there or fastened in some other way. The upper area 15' is designed wider than the lower area with the longitudinal sections 13' mid 14'. The upper area 15' has an upper arched sealing surface 20, which has its highest point in the middle and falls away to the outside. The upper area 15' is designed in the manner of a segment of a circle. Provided additionally in the upper area 15' is a recess 21 running through the profile element 6', which is designed at a constant distance to the sealing surface 20. The recess 21 longitudinal in cross-section is therefore designed likewise arched, whereby the highest point of the recess, as well as the highest point of the sealing surface 20, is arranged right above a vertical belt 5 and is designed to fall away slightly on both sides. The result of this design is that a buffer function can occur in particular through the recess 21 or the cavity and the driven rollers can be looped vertically to the focal plane, so that the area, in which the profile element 6' rests on the roller 2, is enlarged.

What is claimed is:

1. A roller conveyor with rotating rollers (2) for transporting goods with a belt (4, 5) arranged under the rollers (2) for driving the rollers (2), whereby the belt (4, 5) is aligned substantially vertical, characterized in that arranged on the upper edge of the belt (4, 5), in contact with the rollers (2), is a continuous profile element (6), and in that the profile element (6, 6') is designed to be wider than the belt (4, 5) and projects over the latter on both sides.

2. The roller conveyor as claimed in claim 1, characterized in that the profile element (6, 6') is designed symmetrically to the vertical axis of the belt (4, 5).

3. The roller conveyor as claimed in claim 1, characterized in that the profile element (6, 6') has polyurethane.

4. The roller conveyor as claimed in claim 1, characterized in that the profile element (6, 6') is substantially a T-shape.

5. The roller conveyor as claimed in claim 1, characterized in that the part of the profile element (6), which is provided as a bearing on the rollers (2), is designed as a 2-point bearing.

6. The roller conveyor as claimed in claim 1, characterized in that the belt (4, 5) is substantially rectangular in cross-section.

7. The roller conveyor as claimed in claim 1, characterized in that the belt (4, 5) and the profile element (6, 6') are designed monobloc.

8. The roller conveyor as claimed in claim 1, characterized in that the belt (4) is preferably arranged in the region of the inner track of a curve of the roller conveyor (1).

9. The roller conveyor as claimed in claim 1, characterized in that the roller conveyor (1) has crowned drives and guides.

10. The roller conveyor as claimed in claim 1, characterized in that ball bearings (19) are provided arranged laterally to the vertically aligned belt (4, 5).

11. The roller conveyor as claimed in claim 1, characterized in that the part of the profile element (6, 6'), which is provided for bearing on the rollers (2), is designed arched.

12. The roller conveyor as claimed in claim 11, characterized in that the profile element (6') has a recess (21).

13. The roller conveyor as claimed in claim 12, characterized in that the upper region (15') of the profile element (6') is designed in the manner of a segment of a circle.

14. The roller conveyor as claimed in claim 13, characterized in that the recess (21) is designed at a constant distance to the upper sealing face (20) of the profile element (6').

15. A belt for use in a roller conveyor (1) with rotating rollers (2) for transporting goods with a belt (4, 5) arranged under the rollers (2) for driving the rollers (2), and in which the belt (4, 5) is aligned substantially vertical, the upper edge of the belt (4, 5) is provided with a continuous profile element (6, 6') which is wider than the belt (4, 5) and projects over the latter on both sides, thereby causing the continuous profile element (6, 6') to be in contact with rollers (2).

* * * * *